H. C. BLUTHENTHAL.
DEVICE FOR OPENING RECEPTACLES.
APPLICATION FILED DEC. 11, 1913.
1,147,206.
Patented July 20, 1915.
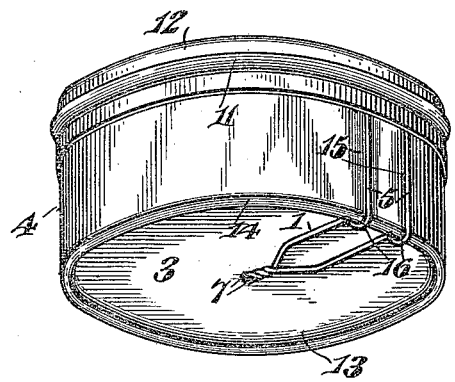
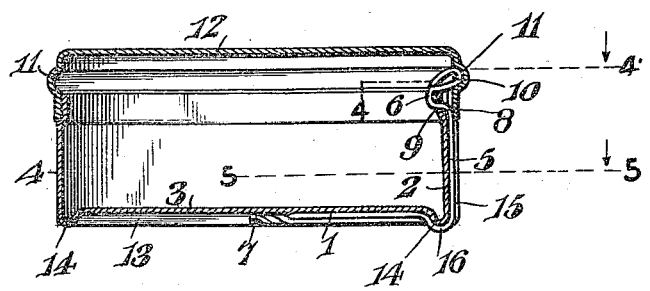
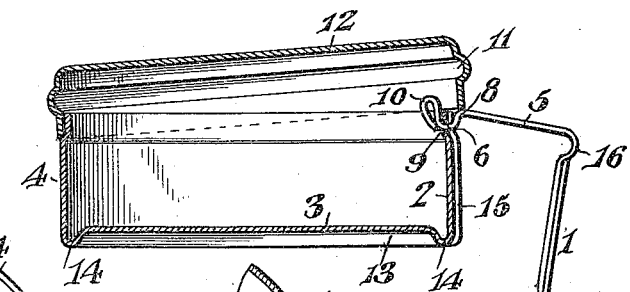
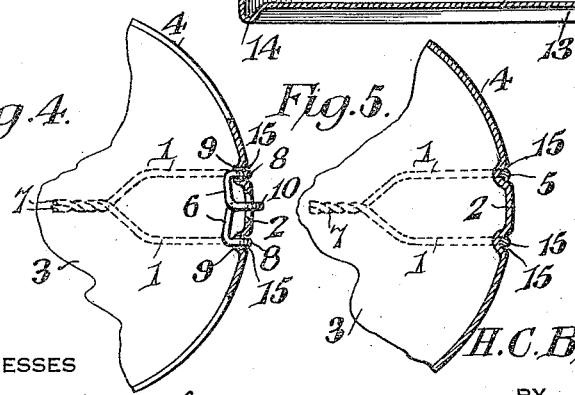
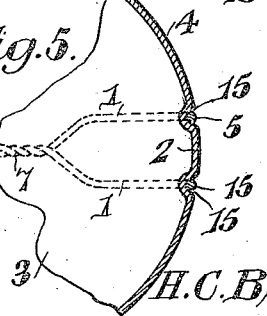
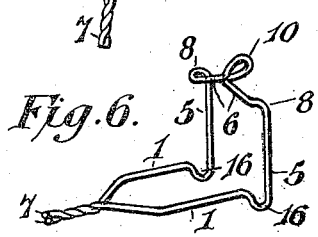
WITNESSES
H. C. Bluthenthal INVENTOR
BY
ATTORNEY

UNITED STATES PATENT OFFICE.

HERBERT CLAY BLUTHENTHAL, OF PINE BLUFF, ARKANSAS.

DEVICE FOR OPENING RECEPTACLES.

1,147,206.　　　　　Specification of Letters Patent.　　Patented July 20, 1915.

Application filed December 11, 1913. Serial No. 806,031.

*To all whom it may concern:*

Be it known that I, HERBERT C. BLUTHENTHAL, a citizen of the United States, residing at Pine Bluff, in the county of Jefferson and State of Arkansas, have invented a new and useful Device for Opening Receptacles, of which the following is a specification.

The invention relates to improvements in devices for opening receptacles.

The object of the present invention is to improve the construction of devices for opening receptacles, and to provide a simple, efficient and comparatively inexpensive device adapted to be readily applied to various kinds and sizes of sealed cans, boxes, and other receptacles, and capable of being easily operated to remove the lid or cover from the body of the receptacle, and adapted also to form a lock for retaining the lid or cover of the receptacle in place.

It is also an object of the invention to provide a lid or cover opening device capable of being interlocked with the body of the receptacle in a position, which will not interfere with the placing of the lid or cover on the said body, and which will lie within the contour of the receptacle so as to be out of the way and in a protected position to prevent it from being injured or accidentally lifting the lid or cover.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a receptacle provided with an opening device, constructed in accordance with this invention, the receptacle being closed. Fig. 2 is a vertical sectional view of the same. Fig. 3 is a vertical sectional view, the opening device being swung outwardly and the cover being raised. Fig. 4 is a detail horizontal sectional view, taken substantially on the line 4—4 of Fig. 2. Fig. 5 is a similar view on the line 5—5 of Fig. 2. Fig. 6 is a detail perspective view of the cover opening lever.

Like numerals of reference designate corresponding parts in all the figures of the drawing.

In the accompanying drawing in which is illustrated the preferred embodiment of the invention, the receptacle opening device comprises in its construction an approximately L-shaped lever 1 adapted to fit exteriorly against the side or wall 2 and the bottom 3 of a tin box or can 4, and preferably constructed of a single piece of resilient wire, as clearly illustrated in Fig. 6 of the drawing. The lever is composed of two approximately L-shaped sides 5 and a connecting transversely disposed top portion 6, the terminals 7 of the wire being preferably twisted together at the lower or inner ends of the sides. The vertical portions of the sides 5 are connected with the top transverse portion 6 by slight bends 8, extending inwardly through perforations 9 of the side or wall 2 of the receptacle, the transverse top portion 6 being located interiorly thereof and provided with an outstanding loop 10, adapted to extend into an interior groove 11 of a lid or cover 12 to assist in locking the same on the body 4 of the receptacle. The slight bends 8, which extend inwardly, fulcrum the lever on the wall 2 of the receptacle and enable the L-shaped sides to swing outwardly and inwardly. The loop 10 is arranged in a transverse plane and forms a rounded outer projection, which conforms to the configuration of the groove 11, the latter being curved in cross section, as shown.

The receptacle is provided at the bottom with an exterior recess 13 forming a projecting peripheral portion 14 and receiving the bottom approximately horizontal portion of the L-shaped lever, as clearly illustrated in Fig. 2 of the drawing, the vertical portions of the sides 5 of the lever being received within vertical grooves 15 stamped or otherwise formed in the outer face of the wall 2 of the body of the receptacle. The horizontal portions of the sides 5 of the lever are provided adjacent to the vertical portions of the said sides 5 with approximately U-shaped bends 16, which embrace the projecting peripheral portion 14 and engage the same at the inner side thereof, whereby the resilient lever is interlocked with the body of the box and retained in the position shown in Figs. 1 and 2 of the drawing. When the lever is swung outwardly from the position shown in Figs. 1 and 2 of the drawing to that illustrated in Fig. 3, the outstanding projection 10 is carried inwardly from the groove 11 of the cover and the vertical portions of the sides are swung upwardly and engage with the adjacent portions of the lower edge of the flange of the cover, which is thereby lifted from the body of the receptacle. When the lever is fitted against and interlocked with the body of the receptacle, the cover may be readily applied to the receptacle and the said cover may be placed on the body of the receptacle so tightly that it is impossible to remove the same from the receptacle with the unaided hands, and the lever will operate to enable the cover to be easily and quickly removed.

What is claimed is:—

1. The combination with a receptacle having a cover provided with a groove, a lever fulcrumed on the receptacle and having a locking portion extending within the receptacle and engaging the groove of the cover to retain the cover in place, said lever having a portion arranged on the exterior of the receptacle and adapted to be operated to swing the locking portion out of the groove of the cover, and at the same time lift the cover from the receptacle.

2. In combination with a receptacle having a cover, a lever extending through a wall of the receptacle and fulcrumed thereon and having an exterior portion arranged to swing upwardly to lift the cover, said lever being also provided with an interior portion arranged to engage the cover to hold the same on the receptacle.

3. In combination with a receptacle having a cover provided with an interior groove, a lever fulcrumed on the receptacle and extending into the same and having an exterior portion arranged to swing upwardly to lift the cover, said lever being also provided with an interior portion arranged to swing outwardly into engagement with the groove of the cover to hold the latter on the receptacle.

4. In combination with a receptacle provided with a bottom having a projecting peripheral portion and a cover, a lever fulcrumed on the upper portion of the receptacle in position to engage and lift the cover and adapted to swing downwardly therefrom against the exterior of the receptacle and extending to the bottom of the same, said lever being provided with a bottom portion having a bend arranged to be sprung into and out of engagement with the peripheral portion of the receptacle.

5. In combination with a receptacle having a vertical groove and provided in its bottom with a depression forming a projecting peripheral portion and a cover, an exterior lever fulcrumed on the receptacle at the upper portion thereof in position to engage and lift the cover, and adapted to swing downwardly therefrom against the receptacle, said lever fitting in the said vertical groove and provided with an inwardly projecting portion extending into the depression of the bottom of the receptacle and engaging the peripheral projection thereof.

6. In combination with a receptacle having a cover, an exteriorly arranged approximately L-shaped lever fulcrumed on the upper portion of the receptacle adjacent to the cover and extending downwardly therefrom to the bottom of the receptacle, said lever fitting against the wall and bottom of the receptacle and having means for engaging the latter to retain it against the same, said lever being also arranged to swing outwardly and upwardly from the said wall radially of the receptacle to engage and lift the cover.

7. In combination with a receptacle having a cover, a substantially L-shaped lever composed of spaced sides extending through a wall of the receptacle adjacent to the cover, and an interiorly arranged transverse top portion connecting the sides and provided with an outstanding projection arranged to engage the cover, said L-shaped lever fitting against the sides and bottom of the receptacle and adapted to swing outwardly and upwardly to hold the outstanding projection out of engagement with the cover and to lift the latter.

8. In combination with a receptacle having a cover and provided at the bottom with a projecting portion, an exteriorly arranged approximately L-shaped lever fulcrumed on the upper portion of the receptacle in position for engaging and lifting the cover, and extending to the bottom of the receptacle and fitting against the sides and bottom of the same, said lever being composed of spaced sides provided at their angles with bends arranged to be sprung into and out of engagement with the projecting portion of the receptacle, whereby the lever is held against the same.

9. In combination with a receptacle having a cover, an exterior lever fulcrumed on the receptacle at the upper portion thereof and extending downwardly therefrom to the bottom of the receptacle and provided with means for engaging the receptacle at the bottom to retain it in position against the exterior of the receptacle, said lever being adapted to swing outwardly and upwardly from the wall of the receptacle radially thereof into engagement with the cover to lift the latter.

In testimony that I claim the foregoing as my own, I have hereto affixed my signature in the presence of two witnesses.

HERBERT CLAY BLUTHENTHAL.

Witnesses:
RUSK WILHOIT,
P. I. TRUAX.

Copies of this patent may be obtained for five cents each, by addressing the "Commissioner of Patents, Washington, D. C."